(12) United States Patent
Pinheiro de Andrade

(10) Patent No.: US 7,785,036 B2
(45) Date of Patent: Aug. 31, 2010

(54) INSTALLATION METHOD FOR A PREVENTATIVE BOOMING FOR OIL CONTAINMENT BOOM WITH A SPIRAL CONFIGURATION

(75) Inventor: Flavio Nogueira Pinheiro de Andrade, Leblon (BR)

(73) Assignee: Oceanpact Servicos Maritimos Ltda., Rio de Janeiro (BR)

( * ) Notice: Subject to any disclaimer, the term of this patent is extended or adjusted under 35 U.S.C. 154(b) by 0 days.

(21) Appl. No.: 12/331,585

(22) Filed: Dec. 10, 2008

(65) Prior Publication Data

US 2009/0145854 A1 Jun. 11, 2009

(30) Foreign Application Priority Data

Dec. 10, 2007 (BR) .................................. 0705792

(51) Int. Cl.
*E02B 15/06* (2006.01)
(52) U.S. Cl. ........................................... 405/63; 405/60
(58) Field of Classification Search .................. 405/60, 405/63, 65, 67, 68, 70, 71; 210/242.1, 242.4
See application file for complete search history.

(56) References Cited

U.S. PATENT DOCUMENTS

| | | | | |
|---|---|---|---|---|
| 3,567,019 A * | 3/1971 | Headrick | ..................... | 405/70 |
| 3,640,073 A * | 2/1972 | Samsel | ..................... | 405/70 |
| 3,695,042 A * | 10/1972 | Denison | ..................... | 405/63 |
| 3,731,491 A * | 5/1973 | Markel et al. | ..................... | 405/67 |
| 3,803,848 A * | 4/1974 | Van't Hof | ..................... | 405/63 |
| 3,807,178 A * | 4/1974 | Tanksley | ..................... | 405/67 |
| 3,882,682 A * | 5/1975 | Appelblom et al. | ..................... | 405/67 |
| 3,943,720 A * | 3/1976 | Milgram | ..................... | 405/63 |
| RE28,966 E * | 9/1976 | Blockwick | ..................... | 405/70 |
| 4,124,981 A * | 11/1978 | Preus | ..................... | 405/70 |
| 4,174,185 A * | 11/1979 | Toki | ..................... | 405/63 |
| 4,174,186 A * | 11/1979 | Kasai et al. | ..................... | 405/63 |
| 4,201,495 A * | 5/1980 | Preus | ..................... | 405/63 |
| 4,295,756 A * | 10/1981 | Blair | ..................... | 405/70 |
| 5,071,286 A * | 12/1991 | Separovich | ..................... | 405/70 |
| 5,238,327 A * | 8/1993 | Blair et al. | ..................... | 405/70 |
| 5,580,185 A * | 12/1996 | Ware | ..................... | 405/63 |
| 5,871,305 A * | 2/1999 | Allen | ..................... | 405/70 |
| 2002/0172560 A1* | 11/2002 | Dreyer | ..................... | 405/63 |
| 2004/0234339 A1* | 11/2004 | Dreyer | ..................... | 405/63 |
| 2004/0266287 A1* | 12/2004 | Hampton et al. | ..................... | 405/63 |
| 2005/0260037 A1* | 11/2005 | Nilsen | ..................... | 405/63 |

* cited by examiner

*Primary Examiner*—Frederick L Lagman
(74) *Attorney, Agent, or Firm*—MH2 Technology Law Group, LLP

(57) ABSTRACT

The present invention refers to an installation method for a preventive booming for pollution containment in aquatic environments, such as rivers, lakes, lagoons, bays, or ocean, more specifically for the pollution caused by oil spills. It comprises a plurality of containment boom sections that form a preventive booming in a spiral configuration, allowing the transit of supply and service boats. The preventative booming does not impair the ordinary operation of a platform or offshore installation at the same time that it prevents the immediate exit of the supernatant oil.

4 Claims, 5 Drawing Sheets

INSTALLATION METHOD FOR A PREVENTATIVE BOOMING FOR OIL CONTAINMENT BOOM WITH A SPIRAL CONFIGURATION

BACKGROUND OF THE INVENTION

1. Field of the Invention

The present invention refers to an installation method for a preventive booming, using a containment boom, that floats on water. It is used to contain oil from a spill and so to prevent its spreading during the operations of a drilling platform, production platform, ship platform, Floating Production Storage and Offloading (FPSO), Floating Storage and Offloading (FSO), monobuoy, shuttle tanker, or any other installation on open sea during 24 hours/day and 7 days/week. This preventive booming has a spiral configuration so that the transit of the service and supply boats and the ordinary functions of the platform or offshore installation are not impaired.

2. Description of Related Art

The number of incidents and the volume of oil spilled have decreased progressively in the last few years. The reduction on the number of incidents is associated with a better control and care on operations that involve oil exploration, transport, and storage, which reflects an increase of the environmental responsibility level. Nevertheless, the risk of a spill with contamination of shoreline ecosystems still remains. It is also relevant to say that the extension of the environmental damage caused by the spill is not always proportional only to the volume spilled, but it also depends on the origin of the incident, the type of the product spilled, and its specific toxicity and the magnitude and ecological sensibility of the areas impacted.

In order to define the response strategies and to dimension the necessary resources for an effective response, typically a preliminary assessment is done so that the scenario of the incident can be determined. The response permeates the containment and recovery of the product from the sea and the clean-up of the shoreline environments impacted, using the appropriate techniques.

The oil containment and its subsequent recovery require the use of many types of containment booms and different types of recovery equipment. The response capacity to oil spills permeates the quickness and the effectiveness of the activation of the team; quantity, availability, and applicability of response equipment; quantity and availability of qualified personnel for the work and the meteorological and oceanographic conditions on the incident occasion. The fast containment and recovery of the oil spilled is crucial to avoid the contamination of other areas.

The oil containment is normally done using containment booms or preventive booming that concentrate the oil for its later recovery. There are many types and models of containment booms, manufactured with different materials. The chosen type of the containment boom is related to the incident scenario, the oil type, and the environmental conditions, among other things. There are many ways to configure containment booms at sea such as "J", "U", or "V" format which are chosen depending on the availability of resources and the meteorological and oceanographic conditions. The containment booms can be used not only to contain the oil, but also to deflect oil slicks and protect areas. In the first case, the oil slicks are deviated to less vulnerable locals or more favorable to the use of removal techniques. In the second case, the containment booms are positioned at strategic locations in order to avoid spreading of oil slicks and to reach areas of ecological or socio-economic interest.

Most of the time, the containment of the oil is done together with the recovery, using equipments or materials such as "skimmers", recovery barges, oleophillic ropes, vacuum trucks, and granulated absorbents, among others. Their application is related to the type of the oil; spill extension; impacted areas; access and meteorological and oceanographic conditions.

One variation of the containment boom is described in WO04035937A1. This document describes a containment boom whose main purpose is to contain oil and/or similar forms of pollution at sea, rivers or any water surfaces, comprising an elongated body constituted by an element that floats at the surrounding environment (the freeboard) and a hanging skirt. The containment boom is generally towed or anchored assuming a "U" format and holding side arms that delimit a front opening and that extend from the rear area or apex. The free ends of the containment boom arms are towed or anchored in such a way that the hanging skirt positioned on the apex collects or isolates the oil spilled and/or other types of pollution from the water surface.

U.S. Pat. No. 3,803,848 discloses a containment boom arrangement formed by the union of many arches so that they form a structurally sinuous wall. A pair of sinuous walls can be joined by an extremity to form a V shape structure, and many walls can be joined end to end to form a polygonal enclosure for oil. This wall is preferably formed by the combination of floating plastic and wood and it is constituted by the union of arches joint in alternate directions (the odd arches disposed in one direction and the even in the opposite one), independently of the desired containment boom size. The joint of two walls or the vertices of the polygon is connected to the conventional anchors to keep this compartment into a substantially fixed position.

U.S. Pat. No. 4,976,855 describes an oil recovery for the oil removal from the water surface comprising at least 2 containment booms disposed in a "V" shape in front of a ship. The containment booms have a screw format, so that their rotations move the water and oil surface to the direction of a recovery container into the ship.

Russian patent No. RU2117095C1 refers to a containment boom that collects and keeps oil and oil products on the surface of currents and water basins. The patent focuses on contamination that is due to the leakage of oil (or oil products) from a pipeline and also due to spill of tanks. The containment boom comprises not only a floating body made of impermeable and hermetic material but also a ballast net.

WO83/00710 reveals a device that forms a containment boom for water protection against oil spills. This device comprises a tubular body, subdivided in two cameras by a longitudinal wall where its inferior longitudinal camera is filled with water, while the superior one is filled with air. The device includes ropes that are fastened in loops. The device rigidity is essentially influenced by the prevalent pressure in one of the two cameras.

The disadvantages of such containment booms or devices mentioned above are that they are thrown or put in action only after the occurrence of the oil spill, provoking a delay on the containment operations and allowing an initial oil spreading that increases the difficulty of the oil recovery.

Hence, there is a need for common or universal strategies for oil spill recovery that meet the environmental protection standards and requirements between the occurrence of the oil spill and the time response actions are taken.

SUMMARY OF THE INVENTION

One of the main purposes of the this invention is to provide an effective installation method for a preventive booming, considering the time and the cost to do so, and an environmentally sound means to contain the oil spilled.

The objective above and other ones are surprisingly obtained by what follows. The present invention provides an installation method for a preventive booming for oil containment whose configuration is fixed and spiral.

The invention also provides a new installation method for a preventive booming that allows the free transit of the service and supply boats that work for the platform or the offshore installation.

The new installation method for a preventive booming offers the following advantages over the conventional ones, which are: pre-installed preventive booming around the platform, ship or offshore installation, independently of the occurrence or not of an oil spill. Thus, in any oil spill case, the preventive booming will be already acting on containment, avoiding oil spreading and allowing its fast recovery through the conventional methods versed in the technique, such as skimmers, bombs, hoses, and temporary storage. The spiral configuration allows a sufficient opening for a safe navigation and prevents the outflow of oil. Moreover, the configuration allows an easy and fast evacuation and escape operation in case of emergency. The spiral configuration can be applied to any type of containment boom made with any material that meets the floatability needs (volume/weight ratio) and tension resistance. It can be installed anywhere where there is a change in the direction of the current.

BRIEF DESCRIPTION OF THE DRAWINGS

The characteristics of the installation method for a preventive booming for polluted waters, using a containment boom, will be better understood from the detailed description below, which is provided only for exemplification purpose and it is associated with the following drawings, which are part of the present specification.

DETAILED DESCRIPTION OF THE INVENTION

The installation method for a preventive booming, using a containment boom, an object of the present invention, will be described here in reference to the attached drawings.

The present invention describes an installation method for a containment boom to be used in case of pollution on aquatic environments, such as rivers, lakes, lagoons, bays, or oceans, more specifically for the pollution caused by immiscible liquid spill lighter than water, such as oil.

This installation method for a preventive booming takes into consideration the following stages: dimensioning, installation and uninstallation, and maintenance.

In order to estimate the dimensioning of the preventive booming, its opening for entrance and exit of ships and/or the lengths of these ships should be considered as parameters. Particularly, the opening of the preventive booming for entrance and exit of ships should be at least ten times the breadth of the largest ship that will transit or twice its length. More particularly, the distance between the platform or offshore installation and the containment boom should be at least five times the length of the largest ship that will operate inside the preventive booming of at least 180° from the entrance opening.

Moreover, the meto-oceanographic conditions of the region are considered for the installation period of the preventive booming. The resultant of exerted forces by the current, winds and waves should be supported by the preventive booming.

The installation stage of the preventive booming is done with supply boats suitable to throw containment booms and small boats for handling and connecting the containment boom sections at sea. The planning for uninstallation of this preventive booming should be done in advance and will employ the same structure used for its installation.

It should be considered a previous planning for the maintenance of the individual preventive booming sections, replacing it with a reserve section. The dimensioning of the number of containment boom sections and the number of reserve containment boom sections should consider the characteristics of the preventive booming and its anchorage.

Moreover, the anchorage system should support the preventive booming in place, without generating crashes or cyclic forces that could destroy it.

Hence, the preventive booming must be anchored on the seabed so that its position and function be kept independently of the current direction. The anchorage can be done by many known ways, but for offshore installations, for example, with more than one knot of current conditions and waves with more than 1.5 meters, it is necessary to have a special anchorage scheme in order to minimize the efforts on the preventive booming and to guarantee its quality.

Figure 1:
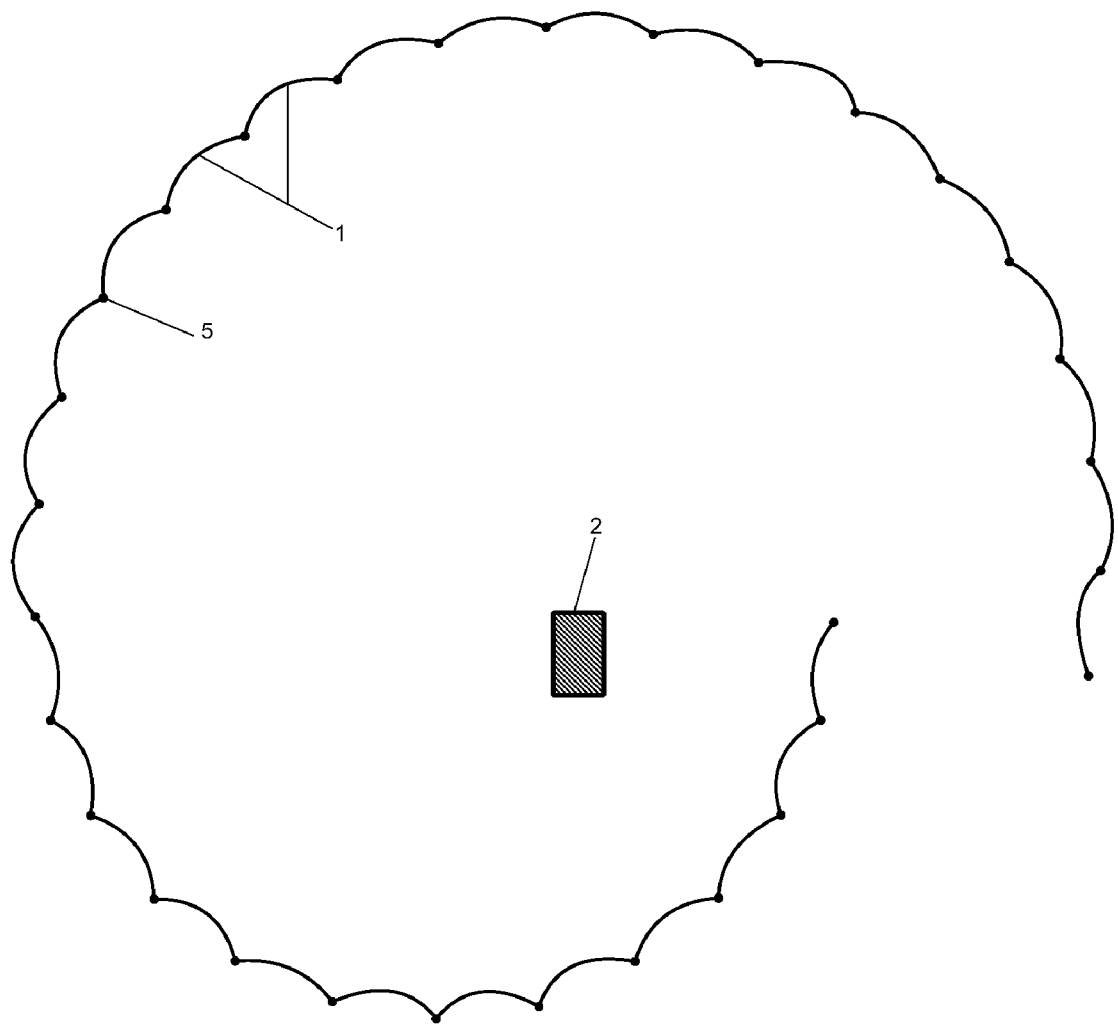
FIG. 1 shows an upper view of the present invention.

FIG. 1 shows this preventive booming that comprises a plurality of containment boom sections (1) that are interconnected to each other, through its connection points (5) to form a preventive booming whose extension is sufficient to enclose the desired area.

Figure 2:
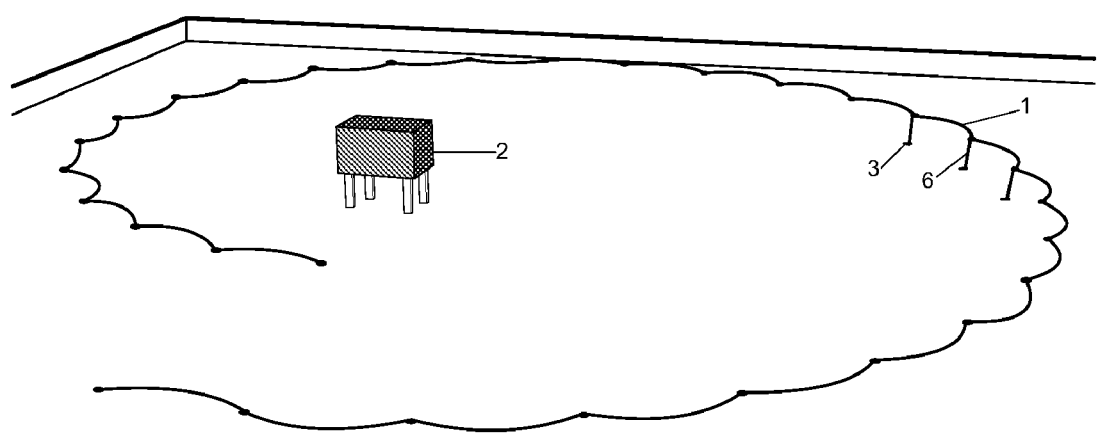
FIG. 2 shows a detailed view of direct anchoring.

As an alternative embodiment of the present invention, according to what it is showed in FIG. 2, the containment boom sections (1), which can have any length, particularly between 25 and 100 m per section, are connected one to the other. In every desired length, the containment boom sections (1) are connected directly through the connection means (6), such as polypropylene cables, nylon, steel, chain cables or chains, to an anchor or a grapnel (3) (that is a block made of iron, concrete or any other heavy material) installed on the seabed.

Figure 3:
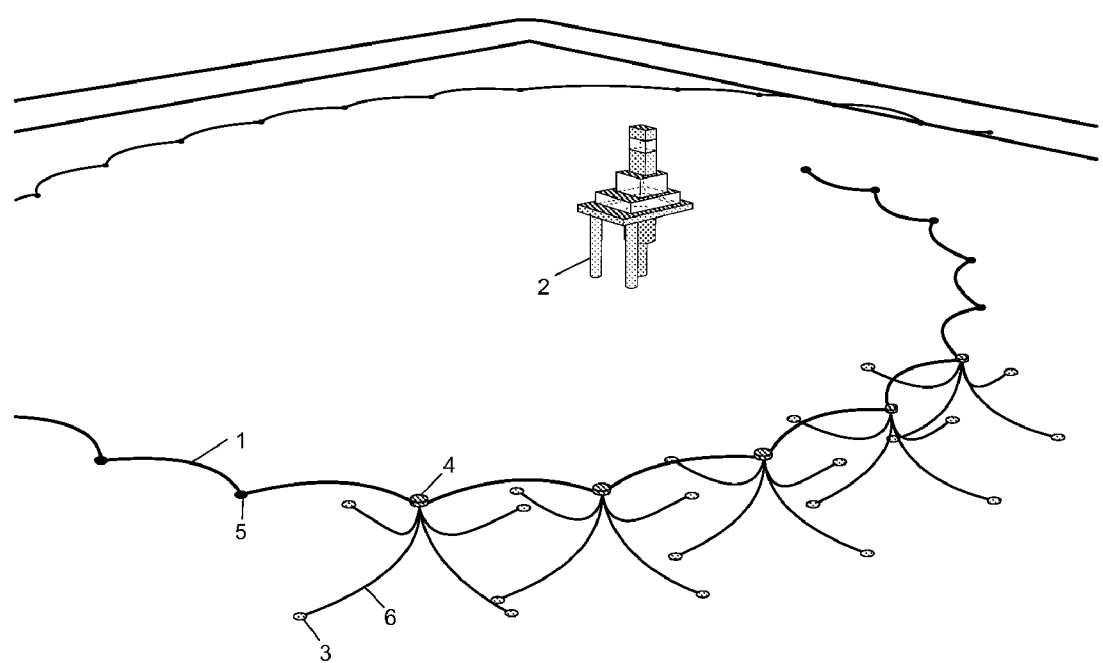
FIG. 3 shows a detailed anchorage view with the aid of floats.

FIG. 3 shows a containment boom section (1) that forms part of the preventive booming. Thus, as a second alternative embodiment of the present invention, the anchorage is done using floats (4), such as buoys. The containment boom sections (1) are interconnected one to the other and in each defined gap, that is, connection point (5) a float is connected (4). This gap (5) can be of any size, but it is typically employed 25, 50, 100, or 200 m gaps. This float (4) is connected to anchors or grapnels (3), located on the seabed, through connection means (6), such as cables. These connection means (6) can be polypropylene cables, nylon, steel, chain cables or chains. Preferably, each float (4) is connected to four anchors or grapnels (3) located on the seabed.

It was observed that according to the sea and current conditions, the exerted forces on the grapnel-buoy system can reach some dozens of tons, depending on the installation manner of this system. Studies confirmed that the efforts suffered by the buoy-grapnel anchorage set can reach more than 10 t when it is employed containment booms with a total height of 1.3 m and 100 m gaps between the buoys, in a current condition of less than 1 knot. Moreover, the harmonic regimen of the oscillation system leads to an effort so that a related movement between the containment boom and the buoys are created, generating very strong forces in their connection and damaging the containment booms in a short period of time. Moreover, the forces of the grapnel-buoy system have a pronounced oscillatory pattern.

In order to minimize the forces exerted on this system, a new anchorage system was developed and it takes into consideration the oscillation suffered by the containment boom and the buoy, as it can be seen in FIG. 3, so that tension peaks on connections can be avoided.

Figure 4:
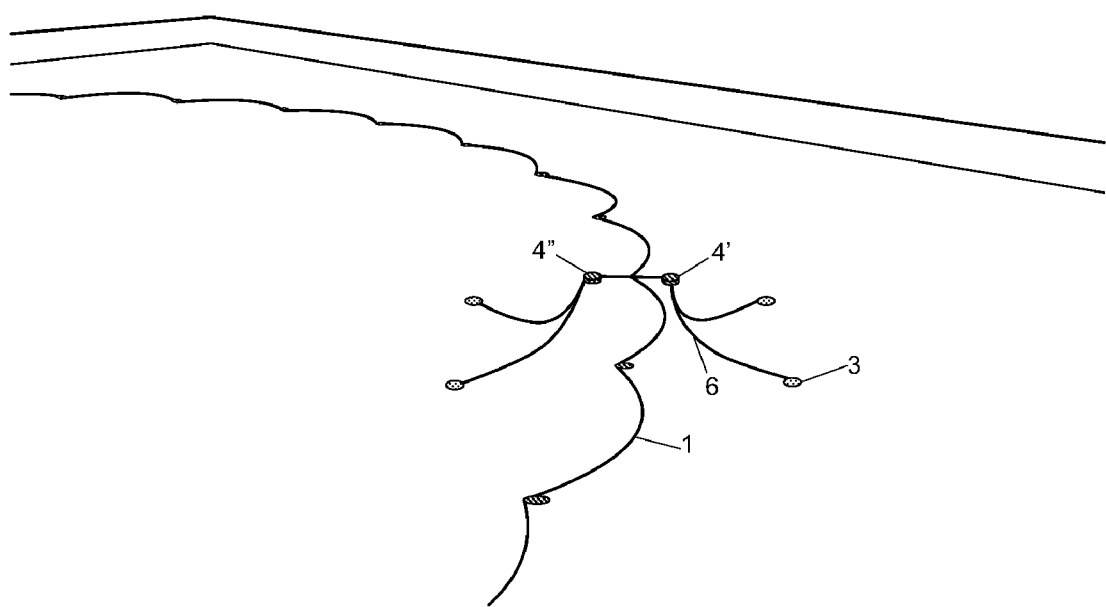
FIG. 4 shows a detailed internal/external double anchorage view of the preventive booming.
Figure 5:
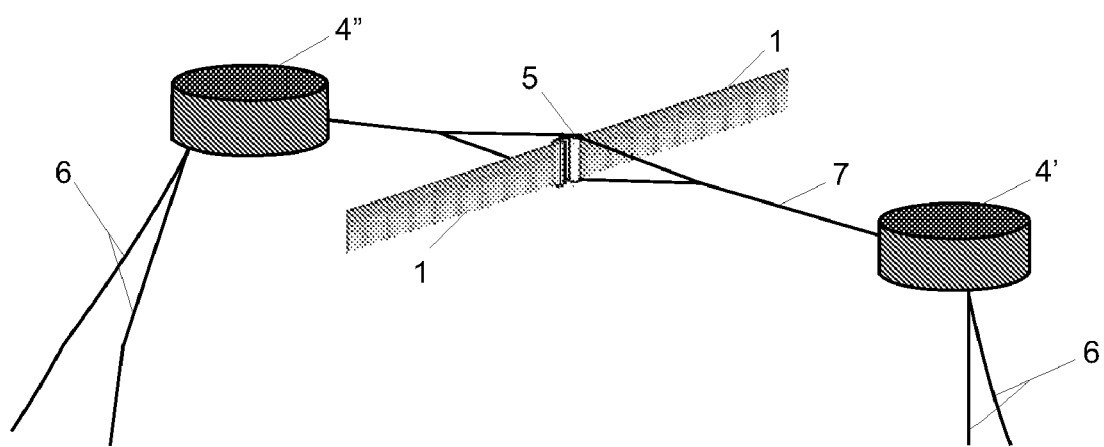
FIG. 5 shows an amplified view of the connection means illustrated on FIG. 4.

FIGS. 4 and 5 illustrate another and more preferred alternative embodiment of the present invention, in which the anchorage is done through the formation of a floats belt. The containment boom sections (1) are connected directly one to the other. The floats (4', 4") are connected to the connection points (5), located between the containment boom sections (1), through connection means (7), such as polypropylene cables, nylon, steel, chain cables or transversal horizontal chains. Each float (4', 4") is anchored by two anchors or grapnels (3) located on the seabed. The first float (4') "holds" the preventive booming in order to avoid its opening resulting in its spacing related to the platform or installation (2) that it is intended to be enclosed. The second float (4") "holds" the preventive booming in order to avoid its closure resulting in its approach related to the platform. Hence, there is a buoys belt anchored inside the preventive booming and another one anchored outside it.

Then the transference of the vertical oscillations, caused by waves, between the floats and the containment boom system is practically null, preventing an accelerated attrition of the connection and allowing a more effective behavior of the containment booms that float freely, accompanying the sea waves without any vertical resistance and avoiding the escape of the oil.

As an example, these configurations can be also applied in bunkering procedures of aquatic transports. Preferably the internal/external double anchorage method for the preventive booming is used with the formation of a buoys belt on offshore marine environments.

It should be considered that although the invention has been described in details and with references to its specific terms, it is clear for those versed in the technique that many changes and modifications can be done in the claimed invention without the loss of meaning of the scope and the spirit of the invention.

The invention claimed is:

1. A method for installation of a preventive booming, in which the preventive booming is in a fixed position and comprises a plurality of containment boom sections, said method comprising:
   connecting boom sections to each other through their connection points, wherein the connection points each comprise one or more floaters or buoys, and wherein at least some of the connection points are attached to at least two anchors or grapnels on the seabed, at least one anchor or grapnel being located inside the containment area defined by the containment boom sections and at least one anchor or grapnel being located outside the containment area defined by the containment boom sections, wherein the preventive booming has a spiral configuration with an opening for entrance and exit of vessels.

2. The method according to claim 1, wherein the opening of the preventive booming for the entrance and exit of vessels is at least ten times the breadth of the largest vessel that will transit.

3. The method according to claim 1, wherein the opening of the preventive booming for the entrance and exit of vessels is at least twice the length of the largest vessel that will transit.

4. The method according to claim 1, wherein the distance between a platform or offshore installation and the containment boom is at least five times the length of the largest vessel that will operate inside the preventive booming in at least 180° from the opening.

* * * * *